COMBINED SIGNAL SEEKING PUSH BUTTON AND MANUAL TUNER WITH DUAL PURPOSE SOLENOID

Filed Aug. 15, 1956 5 Sheets-Sheet 1

INVENTORS
George M. Gaskill &
BY Monfred G. Wright
R. E. Fowler
ATTORNEY

INVENTORS
George M. Gaskill &
BY Monfred E. Wright
R. E. Fowler
ATTORNEY

INVENTORS
George M. Gaskill &
BY Manfred G. Wright
R. E. Fowler
ATTORNEY

Aug. 4, 1959 G. M. GASKILL ET AL 2,898,464

COMBINED SIGNAL SEEKING PUSH BUTTON AND MANUAL TUNER WITH DUAL PURPOSE SOLENOID

Filed Aug. 15, 1956 5 Sheets-Sheet 4

INVENTORS
George M. Gaskill &
BY Manfred G. Wright
R. E. Fowler
ATTORNEY

INVENTORS
George M. Gaskill &
BY Manfred E. Wright
R. E. Foeoler
ATTORNEY 2,898,464

COMBINED SIGNAL SEEKING PUSH BUTTON AND MANUAL TUNER WITH DUAL PURPOSE SOLENOID

George M. Gaskill and Manfred G. Wright, Kokomo, Ind., assignors to General Motors Corporation, Detroit, Mich., a corporation of Delaware Application August 15, 1956, Serial No. 604,238

12 Claims. (Cl. 250—40)

This invention relates to means for tuning radio apparatus and more specifically to combination tuning means providing manual, mechanical preset specific station and automatic indexing of the apparatus operable upon the arrival of received signals. In early radio communication equipment the tuning of the apparatus over a predetermined frequency band was accomplished by some manual means for moving adjustable tuning apparatus. Later preset mechanical adjustable means was provided which was capable of moving the tuning means quickly to given locations to tune in a plurality of preset and most frequently used stations. At a still later date tuning equipment was provided for automatically scanning the frequency band for which the apparatus was designed, together with automatic indexing means to stop the tuner upon the receipt of an incoming signal from a given station. This latter type of equipment has been identified as "signal seeking" tuning means or "stop-on-signal" apparatus. It is desirable to provide a variety of means for controlling radio apparatus.

It is therefore an object in making this invention to provide means for tuning radio apparatus over its designed band which may be operated manually, to preset mechanically located positions, or automatically indexed upon the receipt of an incoming signal.

It is a further object in making this invention to provide radio tuning means which is a combination of manual, mechanical or signal seeking action, any one of which may be operated immediately without the use of any selecting or adjusting part to provide the desired type of operation.

It is a still further object in making this invention to provide combination tuning means having a minimum number of operating parts to provide desired action.

With these and other objects in view which will become apparent as the specification proceeds, our invention will be best understood by reference to the following specification and claims and the illustrations in the accompanying drawings, in which:

Figure 1:
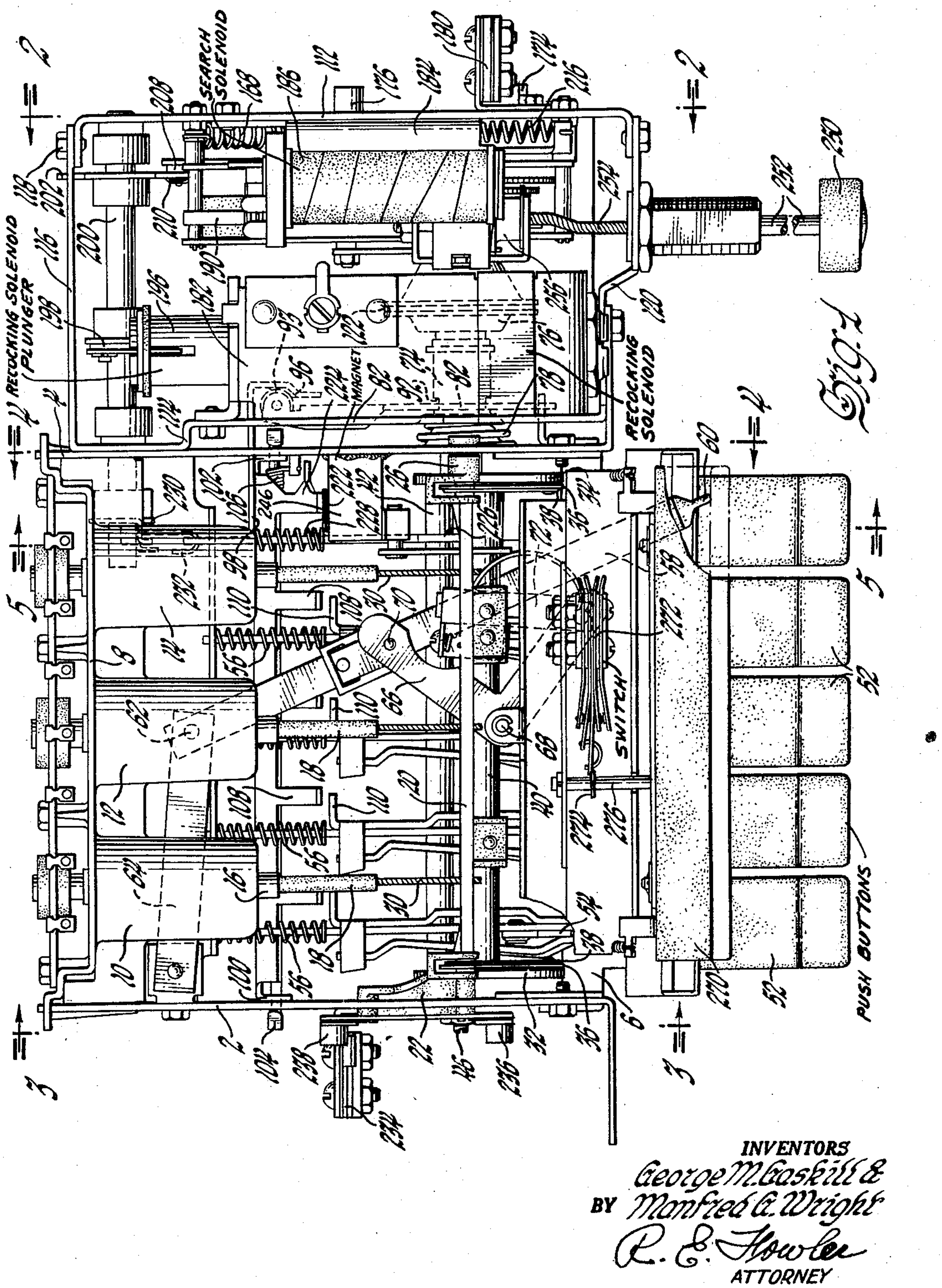
Figure 1 is a top plan view of a combination radio tuning means embodying our invention.

Referring now more particularly to Figure 1, the combination tuner consists of three main parts. The first includes the push buttons and their associated slides and locked cam assemblies which are used to bring the tuning means to different preset mechanical locations. This portion is shown on the left half of Figure 1. On the right-hand side of Figure 1 there is illustrated that equipment which automatically drives or scans the tuning means across the band and causes it to stop upon the receipt of an incoming signal. This is the signal seeking portion. Lastly, in conjunction with the signal seeking drive there is provided a manual control which, by rotation, can move the tuning means to any desired location at any time.

Figure 3:
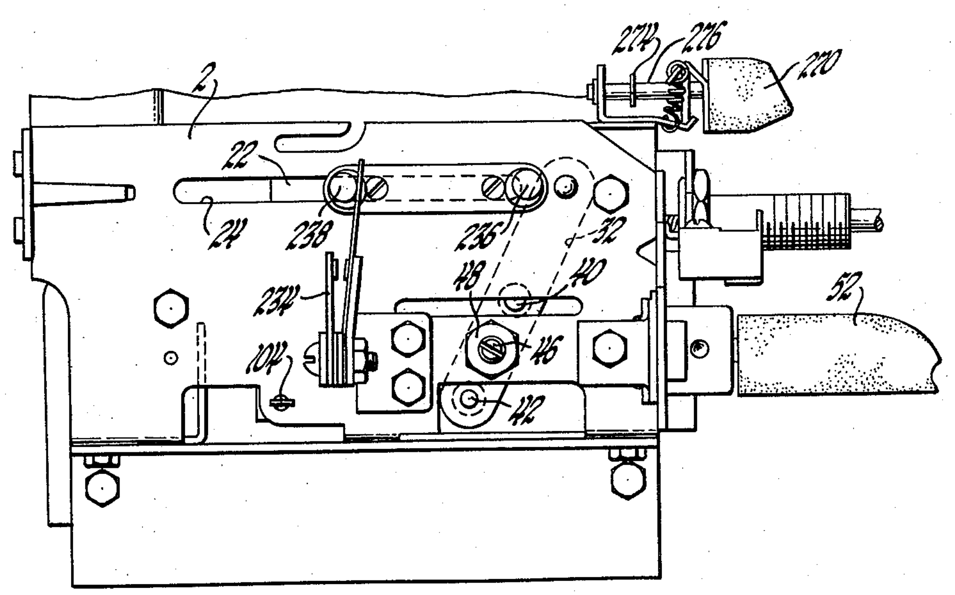
Figure 3 is an end view taken from the opposite end or left-hand side as shown in Figure 1 on the line 3—3.
Figure 4:
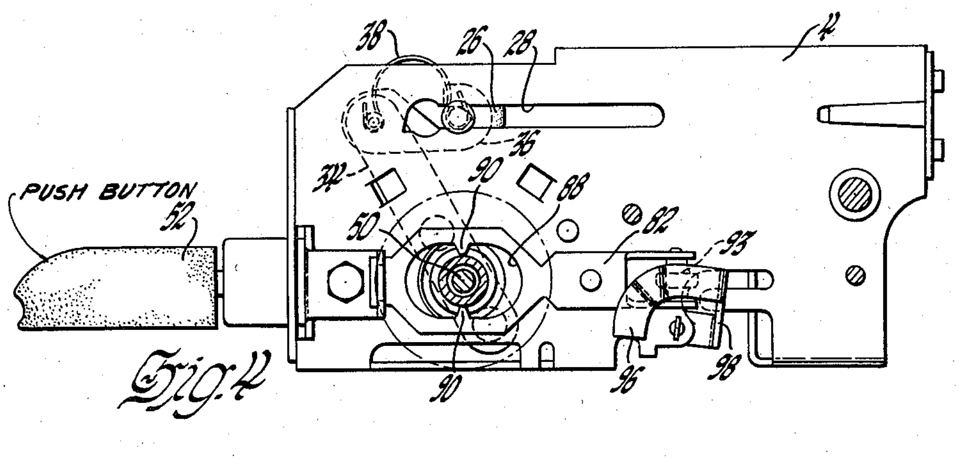
Figure 4 is a vertical sectional view through the tuner taken on line 4—4 of Figure 1.

The tuning means includes a pair of longitudinally extending frame members 2 and 4 which are held together in spaced relation by a transverse member 6 at the front of the assembly and a cross member 8 at the rear to form a roughly rectangular box frame housing the tuning means and the mechanically preset slide means. A plurality of magnetic cylindrical housing means 10, 12 and 14 are mounted on the rear cross frame member 8 and support associated tuning coils on form members 16 in the housing. The three coils in housings 10, 12 and 14 are those commonly connected in the antenna, RF and oscillator circuits, and which are tuned to tune the receiver. A plurality of comminuted iron cores 18 are mounted to be inserted into or withdrawn from the associated tuning coils and reciprocate within the coil forms 16. These cores are commonly mounted on a cross member 20, one end 22 of which is flattened and slides within a slot 24 in the left frame member 2, as best shown in Figure 3. The right-hand end of the cross member 20 is formed by a circular plug 26, and that is adapted to ride in a slot 28 formed in the right-hand frame member 4, as shown in Figure 4. The comminuted iron cores are connected to the cross member 20 by threaded flexible connectors 30 which are embedded in the core material and threaded through openings in the cross member 20 so that they can be adjusted with respect to each other for tracking purposes. Thus as the cross member 20 moves horizontally in the slots 24 and 28, the cores 18 are inserted into or withdrawn from their associated coils to tune the radio receiver.

Figure 5:
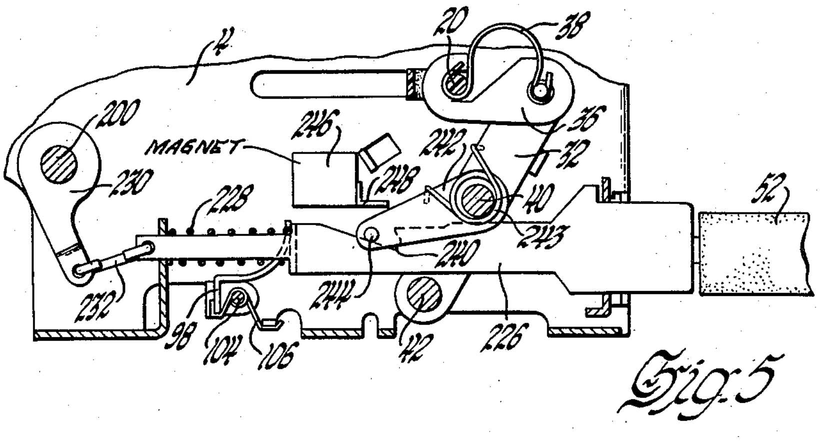
Figure 5 is a partial vertical section taken on the line 5—5 of Figure 1.

The opposite ends of the cross member 20 are connected to two upstanding arms 32 and 34 at the left and right-hand sides respectively by links 36, best shown in Figure 5, which provide pivotal connections between the ends of the arms 32 and 34 and the cross member. A spring 38, supported on the pivot of each link 36 on the arms and extending around the cross member 20, takes up any lost motion in the link connection. The arms 32 and 34 form the two end members of a treadle bar assembly, which also includes two spaced transverse rods 40 and 42 which extend across between the two end members, leaving a space therebetween. The treadle bar assembly formed of the rods 40 and 42 and end arms 32 and 34 is pivoted on the side members 2 and 4 on an axis midway between the two rods. The left end of the treadle bar assembly is best shown in Figure 3 where vertical arm 32 is shown together with the ends of the transverse rods 40 and 42. The end member 32 is provided with a slightly depressed portion into which the pointed end of an adjustable screw 46, carried in the side wall 2, projects, thus forming a pivot about which the arm 32 and its associated treadle bar assembly may rotate. A nut 48 is threaded on the screw 46 and locks it by jamming against side wall 2. The right-hand member 34 has a shaft 50 rigidly connected to the side in alignment with the axis provided by the threaded screw 46, which shaft extends through a bearing in the right-hand wall 4 into a second compartment which houses the signal seeking tuning and manual control.

Mounted on the transverse frame members for reciprocatory movement are a plurality of slide assemblies, each of which projects through the treadle bar assembly and carries an adjustable cam capable of engaging the treadle bar rods 40 and 42 to move that assembly to different predetermined angular positions. The slide bar construction is clearly disclosed in the Schwarz et al. Patent No. 2,490,008, issued January 10, 1950, and their specific construction forms no part of the present invention. They will, therefore, be described only briefly herein. Each of the slide assemblies includes a manually engageable push button 52 mounted on the outer end thereof, depression of which carries the slide assembly inwardly so that the adjustable cam 54 thereof may engage the transverse rods 40 and 42 to bring the treadle bar assembly to a given angular position, and therefore the tuning means to a given position. Each slide assembly is biased outwardly by a spring 56 which bears against a portion of the slide and against the frame member. Thus depression of any one of the buttons 52 will quickly bring the tuning means to a given mechanical angular index determined by the position of the cam 54 on that slide, which sets the tuning means in a given position.

In order to determine the location of the tuning means, an indicating means is provided in the form of a pivoted arm 58 which terminates in a pointer 60 movable in a substantially straight line along the front of the tuner and in proximity to a dial, not shown. The arm 60 is pivotally supported at 62 on the end of a second pivoted link 64 whose opposite end is supported on the side frame member 2. This type of support provides means for the arm 58 to move toward or away from the rear as it moves across the front of the tuner to give a comparatively straight line motion to the pointer 60. A bellcrank lever 66, pivotally mounted at its center on pin 68 on the front cross frame member, has one end pivoted at 70 to the approximate center of the indicating arm 58 and the remote end pivotally connected to a link 72 carried by the cross member 20. Thus as the cross member 20 moves in and out the bellcrank 66 is turned about its pivot 68, causing the indicating arm 58 to move in relatively straight line relation across the front of the tuner.

Figure 8:
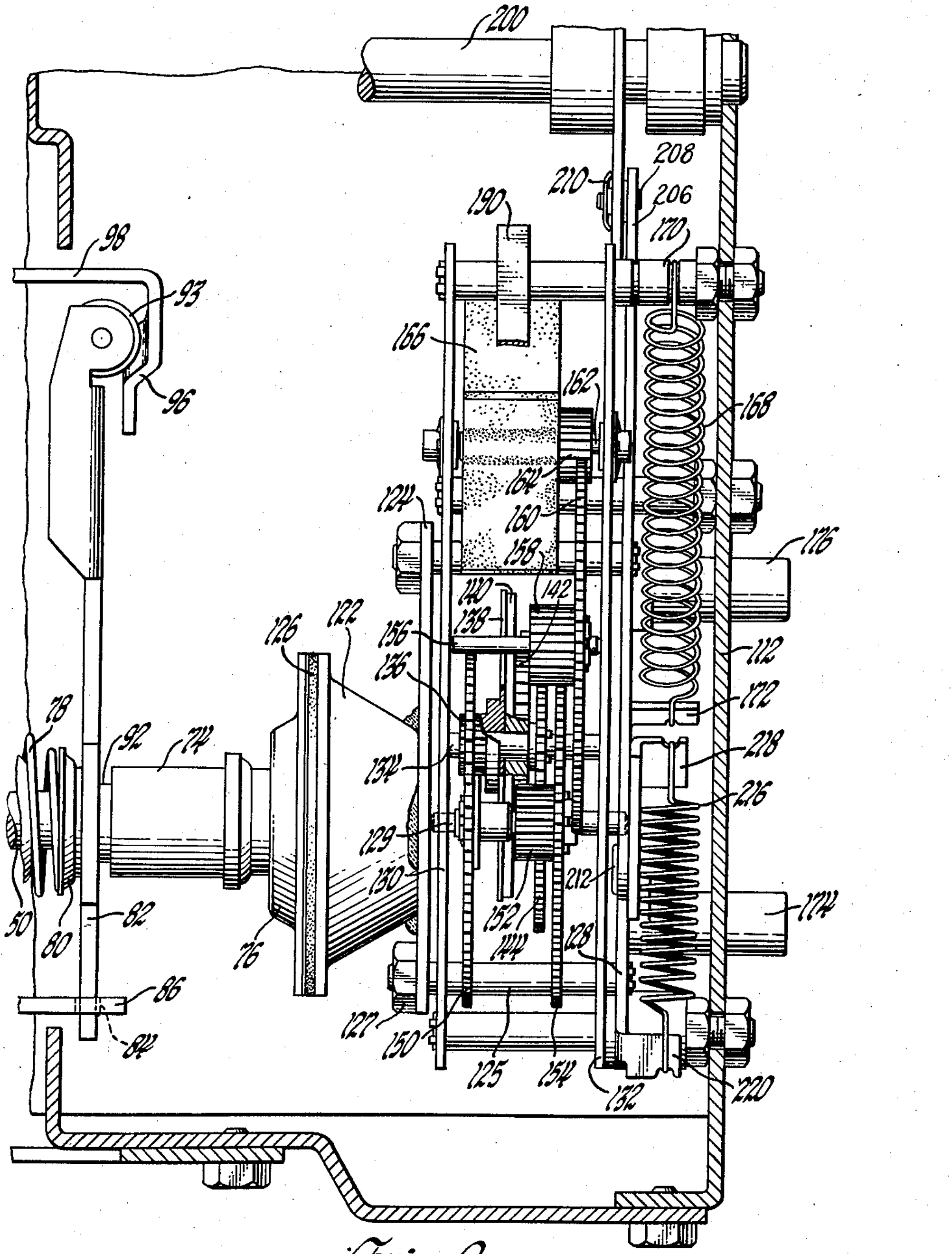
Figure 8 is a sectional view on line 8—8 of Figure 7.

As previously mentioned, shaft 50 projects through side frame member 4. Splined to this shaft so that it may move longitudinally with respect thereto but which will drive the same upon rotation is a collar 74, to one end of which is secured a clutch plate 76. The collar 74 and its associated clutch plate 76 are biased to the right as seen in Figure 8 by a coil spring 78 which seats against the side frame member 4 and against a flanged end 80 on the member 74. By moving the member 74 axially on the shaft 50 the clutch may be caused to engage or disengage. A clutch operating arm 82 has one end pivotally supported by projecting through an opening 84 in a flange 86 projecting from the side of the frame 4. The clutch actuating arm 82 has an enlarged opening 88 therein (see Fig. 4). The side portions adjacent the opening 88 extend around on both sides of the member 74 and are provided with inwardly directed teeth 90 diametrically opposite each other which project into a groove 92 in the member 74. These teeth apply axial force to the member 74 to slide it on the shaft 50 when the operating arm 82 is moved pivotally. The end of arm 82 which projects toward the rear of the apparatus is provided with a rotating wheel 93 which engages a flanged operator 96 extending from a transverse bar 98 extending across the main body of the tuner previously described. This bar 98 is supported in side frame members 2 and 4 for rotation about a longitudinal axis. This support includes a flanged end 100 on the left, as shown in Figure 1, and a separate flanged bracket 102 on the right-hand end. Both of these flanges have aligned openings therein through which a supporting rod 104 projects, which rod acts as an axis of rotation for the bar 98. A spring 106, wound around the rod 104 and bearing against the bar 98, biases it in the clockwise direction, as viewed from the left in Figure 5. Thus when the bar 98 is caused to rotate in a counterclockwise direction as viewed in Figure 5, the cam flange 96 presses against roller 93 on the inner end of arm 82 and forces the arm inwardly to pull the member 74 to the left, as shown in Figure 8, and separate the two parts of the clutch. Transverse bar 98 is provided with a series of spaced operating fingers 108 which engage projections 110 on each of the slide assemblies so that as any slide assembly is depressed the transverse bar 98 will be rotated against its bias to operate the clutching means and free the treadle bar assembly from any load.

A second associated frame is supported on the right-hand side of frame member 4 and includes a side member 112 which extends down the right-hand side as viewed in Figure 1, and then across underneath this portion to form a bottom, and lastly, is secured to side frame 4. A second frame member 114 runs along parallel to side frame member 4 for a majority of its length and is secured thereto and then extends at right angles to the main portion to form rear transverse member 116 which is secured to the corner of the frame member 112 by bolt 118. Lastly, frame member 120 extends across the front of the enclosure formed by the members 112 and 114. Both the signal seeking automatic control section and the manual drive are associated with the other half of the clutch means which engages clutch member 76. This second clutch member 122 is mounted in alignment with the first clutch member on the side frame member 124 of a rotatable planetary carriage. Suitable frictional facing material 126 may be secured to the clutch member 122 to provide sufficient frictional engagement of the two clutch members. The planetary carriage rotates about another portion of a gear train load, and in so doing rotates the clutch member 122.

This planetary carriage consists of two side frame members 124 and 128. These two plates are held together by suitable threaded pins secured to plate 128, spacers 125 between plates, and securing nuts 127 on the end, so that they form a carriage. The planetary carriage is adapted to rotate about an axis formed by shaft 129 of the main gear train to be described, which shaft is rotatably supported by two fixed plates 130 and 132 mounted on the side frame member 112 and extends into openings in the carriage side frame members 124 and 128. The axis of the shaft 129 also coincides with the axis of shaft 50. The fixed spaced plates 130 and 132 carry a rotatable shaft 134 supported therebetween. On shaft 134 there are mounted in sequence from left to right as viewed in Figure 8 the following members: first a small pinion 136, which bears against and is secured to a plate 138, forming one-half of a clutch. A second plate 140 acting as the other half of the clutch is free on shaft 134 but secured in turn to a ratchet wheel 142 and turns therewith. The ratchet wheel is also free on the shaft 134. The last member mounted on shaft 134 on the right-hand side is a spur gear 144 which carries a pivoted pawl 146, the end of which is spring biased inwardly by a spring 148 and is adapted to engage with the teeth of the ratchet wheel 142. Thus the spur gear 144 may be locked, but the pinion 136 may move with respect thereto due to the one-way drive between the two formed by the pawl and ratchet members.

The stationary plates 130 and 132 support a second rotatable shaft 129 upon which there are likewise mounted a series of gears. On this shaft and in proximity to the stationary plate 130 there is first rotatably mounted a large spur gear 150 which is adapted to mesh with the pinion 136. Also independently mounted for rotation on this shaft 129 is a small pinion 152 integrally connected to a large spur gear 154. This unitary assembly forms a part of the gear train load for the motor drive which terminates in the air vane governor. A second rotatable shaft 156 is likewise supported by the two stationary plates 130 and 132 and it supports a pinion 158 and integral spur gear 160, the pinion 158 meshing with the spur gear 154 on shaft 129 and forming a second link in the gear train load. Lastly, a shaft 162 is rotatably supported parallel to the first two shafts 129 and 156 and in spaced relation thereto and this shaft carries a mating pinion 164 which engages the driving spur gear 160 to which is rigidly attached the air vane governor 166. Thus when gear 144 drives pinion 152, the remainder of the gear train and the air vane governor are rotated.

Figure 6:
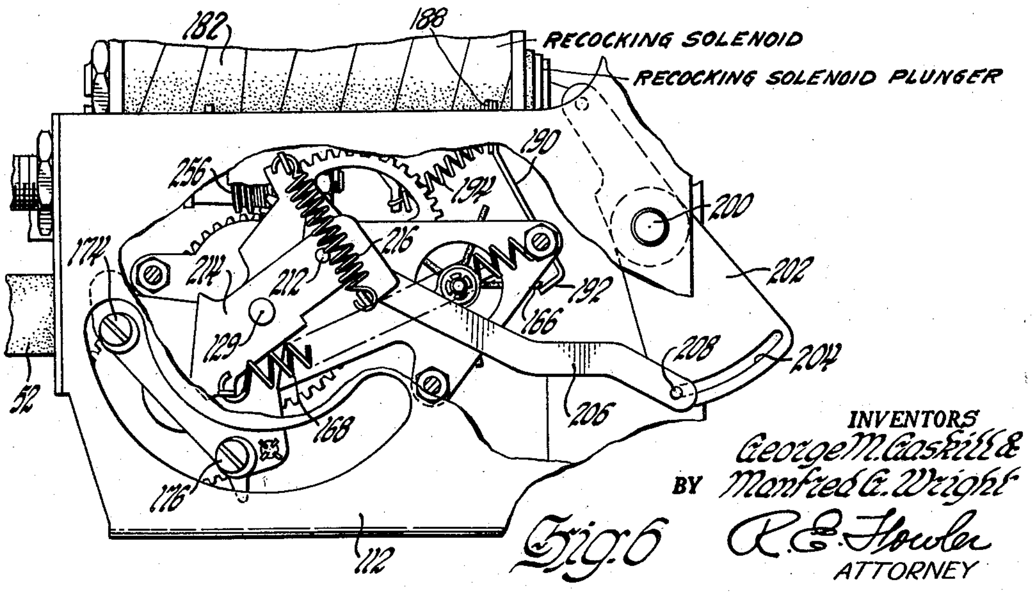
Figure 6 is a side view showing the signal seeking control portion similar to Figure 2 but with the mechanism in a different position.

The planetary carriage is biased toward the rear of the assembly by a driving spring 168 which has one end anchored to a supporting pin 170 of the stationary side plate 128 and the other end connected to a flanged projection 172 on the planetary. Thus if no restraining force is present the planetary carriage will be rotated about its pivot on shaft 129 to its rearmost position. In so turning, of course, it rotates the clutch disc 122 and if the clutch is engaged, the tuner will be moved. The planetary carriage is provided with two adjustable switch actuating plugs 174 and 176, best shown in Figure 6, which are adapted to actuate a limit control switch 180 mounted on the side of the frame 122. This switch is connected in circuit with a cocking or loading solenoid coil 182 whose operation will be later described, but in brief resets the planetary carriage to its foremost position in which the driving spring 168 is fully loaded each time the carriage proceeds to the rearmost position or spring discharge position. When the spring approaches its condition of discharge and the planetary carriage has reached its rearmost position, the switch actuating lug 174 will trip the switch 180, closing an energizing circuit for the coil 182. The latter will then attract its armature to, through mechanism to be described, move the planetary carriage to its foremost position, loading spring 168 until switch actuating lug 176 trips the switch 180 to deenergize the solenoid 182. Thus the planetary carriage will oscillate between two extreme positions of switch actuation.

On top of the side plate 112 on a supporting flange 184 there is mounted a control relay coil 186. This coil 186 is adapted to be connected in the radio receiver circuit and to be energized during periods of searching or automatic seeking and to be deenergized upon the arrival of a signal in the radio receiver for automatic indexing. Mounted on one end of the relay coil support there is a pivoted armature 188 (see Fig. 2) which has secured to one end thereof a detent or arm 190, the end of which is flanged as at 192 and which may engage the vanes of the fly fan governor 166. The armature 188 is spring biased toward the fly fan governor by a biasing spring 194. When the control coil 186 is not energized, detent 192 is so placed as to prevent rotation of the vanes of the fly fan governor 166, but when the relay coil 186 is energized it swings the armature 188 to move the detent 190 out of the way and permit the fly fan governor to rotate and the tuner to be driven.

Figure 2:
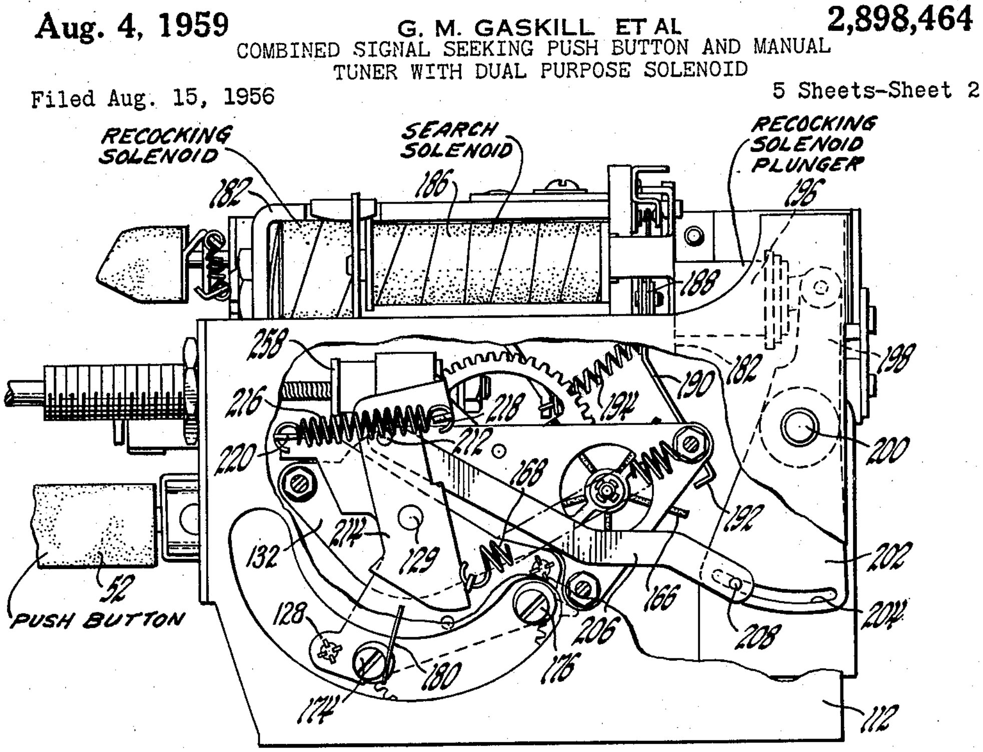
Figure 2 is an end view taken from the right-hand side of Figure 1 on line 2—2, showing parts broken away.

The drive for cocking the planetary to its spring loaded position will now be described. As before mentioned, this is accomplished through energization of a cocking relay coil 182. This coil is mounted on the side frame 114 and actuates an armature 196. The armature 196 is pivotally connected to an arm 198, rigidly secured to a transverse shaft 200 trunnioned on the frame members 112 and 114 (see Fig. 2). Thus when the armature core 196 is attracted by the energization of the coil 182, the shaft 200 will be rotated in a clockwise direction as viewed from the left-hand side of Figure 1. Also secured to the shaft 200 and to the right of arm 198 is a fan-shaped actuating arm 202 having an arcuate slot 204 therein. A driving link 206 carries a pin 208 which projects into this slot and is maintained therein by any suitable means such as a clip pin 210. Thus relative motion may occur between the parts 202 and 206. The other end of driving link 206 is pivotally connected at 212 to a driving member 214, pivotally mounted on the shaft 129 of the planetary. This driving member 214 is spring biased in a counterclockwise direction as viewed in Figure 2 by a loading spring 216, one end of which is secured to the top of the member 214 by hooking over flange 218 and the other end is secured to an extension arm 220 on the planetary carriage. This spring tends to cause the planetary carriage and the driving arm 214 to move as a unit but provides relative motion between the two as the necessity arises and under circumstances to be explained. In general, however, it will be seen that when the core 196 of the cocking solenoid 182 is moved inwardly, the link 206 will be drawn to the rear of the assembly as shown in Figure 2 to rotate the planetary toward the front and load the driving spring 168. From the preceding description it will be evident that when the detent 192 is removed from its obstructing position, permitting the air vane governor and its associated gear train to revolve, that the spring pressure provided by the driving spring 168 will cause the planetary carriage to rotate counterclockwise as viewed in Figure 2, turning the clutch member 122 in the same direction and in like manner driving the treadle bar assembly to tune the receiver. In the event a transmitted signal is encountered, the control relay 186 is deenergized, dropping detent 192 into an obstructing position to stop the tuning means on station. Any suitable control circuit for the relay 186 may be used, such for example as that found in the patent to Guyton 2,652,494, issued September 15, 1953.

It is also apparent that it will be necessary to independently move the tuning means per se from one extremity to another when it has moved from the low frequency end of the band to the high frequency end under the influence of the driving spring inasmuch as the tuning means might be picked up at any intermediate point where it had been moved by one of the slide assemblies or to which it had been adjusted manually. Since the signal seeking drive is always in one direction, the tuner must be reset for each cycle to tune in one direction. The means for moving the tuning means to the opposite extremity of its position is accomplished through the same instrumentality as that which reloaded the spring 186, namely solenoid 182 and its associated core 196. Shaft 200, rotated by solenoid energization, extends through side member 4 to a position to the rear of the first slide assembly to the left of partition 4. The first slide serves a different purpose from the other four slides and is provided only for recocking purposes. It performs no specific indexing function. This slide is reciprocably mounted in the frame members as are the rest. It is provided with a side flange member 222 (Fig. 1) similar to the flange 110 of the other slide assemblies, which engages a foot 224 on the transverse clutch actuating member 98 to mechanically actuate the clutch. Thus reciprocation of this slide assembly 226 also actuates the clutch to disconnect that equipment beyond the clutch from the tuning means. This slide assembly is likewise spring biased toward the front of the tuner by a biasing spring 228 mounted around the rear portion. Mounted on the shaft 200 to the rear of the slide 226 is an operating arm 230 (Fig. 5) connected to the end of the slide assembly through a pivoted link 232. Thus rotation of the shaft 200 in a clockwise direction as viewed in Fig. 5 will pull the slide assembly 226 to the rear against the bias of spring 228. The initial movement of the slide 226 will actuate the clutch operating arm 98 to open the clutch and unload the treadle bar. Continued movement to the rear will cause the tuner to be moved quickly back to its low frequency position.

It is to be noted that energization of coil 182 to attract its core 196 may be either to move the planetary to reload its driving spring 168 or to move the tuning core assembly back to its rearmost position, or both. Each must, therefore, be capable of independent motion and to permit movement of the other without interference. We have previously described the energization and deenergization of coil 182 by limit switch 180. This was to primarily control the movement of the planetary carriage and the loading of spring 168. In order to independently energize coil 182 due to the tuning carriage reaching an extreme position, a second limit switch 234 is mounted on the left-hand side of frame member 2, as shown in Figure 1. A pair of adjustable switch actuating lugs 236 and 238 are mounted in spaced relation on the end of member 22 which extends through the slot 24 in the side frame member 2. Thus as the tuning carriage moves back and forth the lugs 236 and 238 will operate the snapover switch assembly 234 to energize and deenergize coil 182. Switch 234 is connected in parallel with switch 180 and either is capable of operating the cocking solenoid assembly independently of the other.

In order to prevent the tuning carriage from being drawn to the low frequency end of its travel when it is in an intermediate position and the cocking or loading solenoid 182 is energized by limit switch 180, a one-way drive is provided by a pivoted pin assembly which is capable of falling into a driving slot or being held up out of driving position. This is best shown in Figure 5 wherein the slide 226 is shown provided with a tapered slot or notch 240. A pivoted arm 242, freely mounted on transverse treadle bar 40, has a driving pin 244 which may fall into the tapered slot 240. If the pin 244 is in the position shown in Figure 5 and the slide 226 is pulled toward the rear either by manual action or by energization of the driving coil 182, engagement of the pin with the crook in the slot 240 will cause the slide 226 to pull the treadle bar through the connecting link 242 to the rear or low frequency tuned position. If means are provided to hold the pin 244 up out of engagement with the slot 240, then the slide 226 may be moved to the rear without moving the tuner and it will be left in the last indexing position.

The means for holding the driving link 242 up out of engagement is a block of permanent magnet material 246 which is secured on the side frame member 4 and tends to attract the end of the link 242 and pin 244. The pin is adapted to wipe along the undersurface of the block 246. A copper flange 248 is secured to the front corner of the permanent magnet block in order to shade off the magnetic field. In operation as the treadle bar is moved to the rear, the pin 244 riding in slot 240 passes below the block 246 and drives the tuner. Having reached the innermost position the solenoid 182 is deenergized, which permits the shaft 200 to rotate in the opposite direction and the slide 226 to be moved back out to its foremost position under the action of biasing spring 228. Movement of the slide forward raises the inner end of the link 242 as it rides up out of the slot 240 and brings the pin 244 into proximity with the lower surface of the permanent magnet 246 and it is held up. As the treadle bar moves forward through automatic tuning, the pin 244 is held up by the magnetic field, and it continues to remain above the upper edge of the slide 226 until the cores have reached their forward limit of movement for the predetermined band. By this time the pin 244 is out under the copper flange and is forced down by a bias spring 243. (See Fig. 5.) Energization of the coil 182 will now cause the slot 240 to engage the pin 244 and move the tuning means to the opposite extremity. Therefore, unless the treadle bar is entirely at its outer position, any energization of the coil 182 will not cause movement of the tuning means.

Conversely, energization of the coil 182 by the limit switch 234 should not cause movement of the planetary carriage drive if the spring 168 is fully energized. Lost motion in this instance is provided through the pin and slot connection 208 and 204 so that no driving force will be applied to the link 206, at least until pin 208 reaches the left-hand end of slot 204. If at this point shaft 200 still continues to turn and the gear train is locked, the ratchet assembly allows the planetary carriage to rotate thereby extending the mainspring 168. In the event of excessive voltage, relative motion is permitted by expansion of spring 216, which will permit the driving member 214 to move with respect to the planetary carriage and the member 214 will move away from abutment 172 on the carriage. Before the coil 182 is deenergized, however, shaft 200 must return to an unbiased condition and spring 216 will restore the same relative position of the driving means 214 which will again engage abutment 172 of the planetary carriage. Thus, energization of the solenoid cocking or loading coil 182 will cause movement of that part which actuated its limit switch, and a reloading or repositioning thereof. However, the treadle bar limit switch does provide for re-energizing the mainspring regardless of its state of energization.

Figure 7:
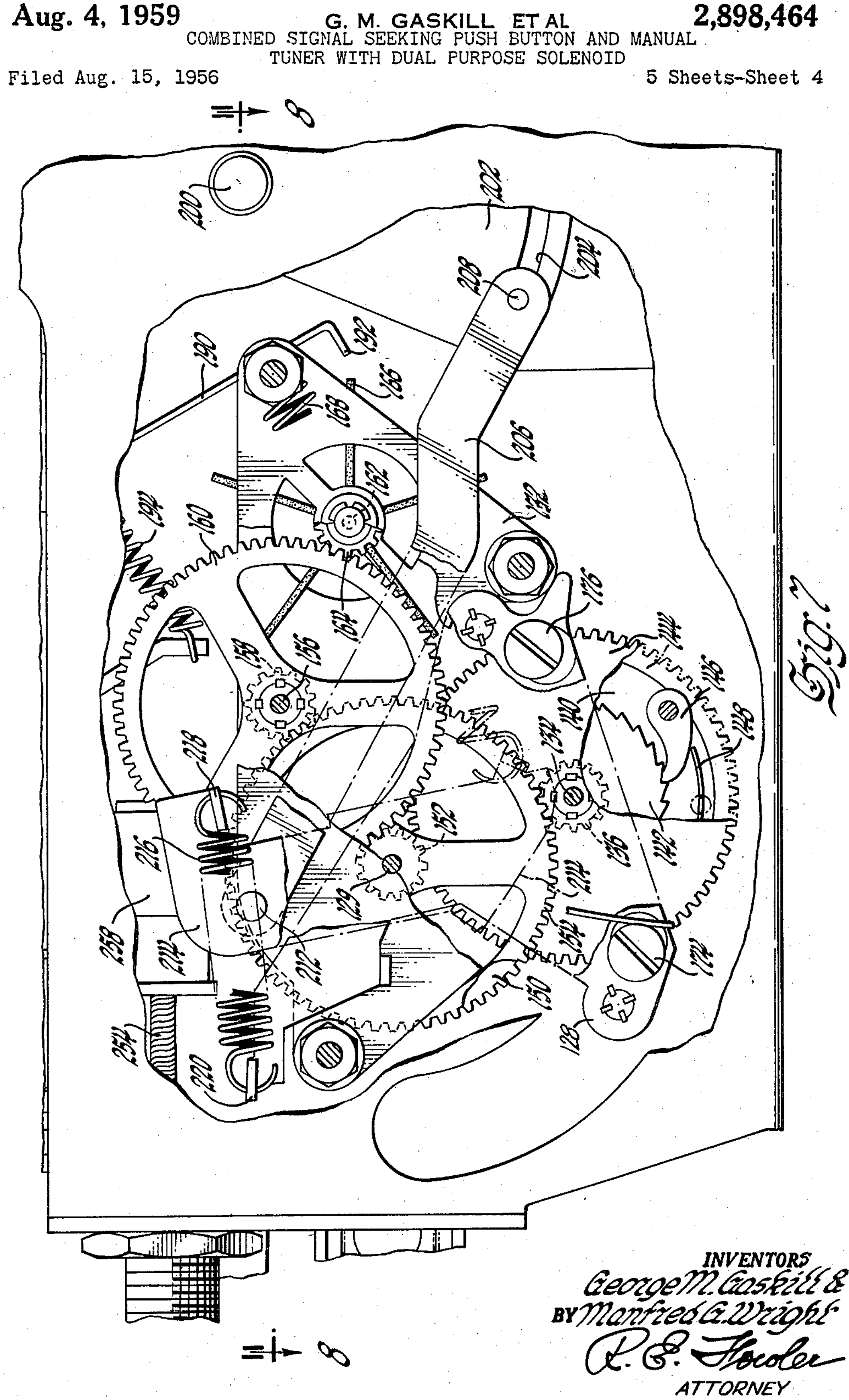
Figure 7 is an enlarged side view of the signal seeking actuating portion similar to Figure 6 showing parts being broken away and shown in section.

Manual means are also provided to at any time provide for manual adjustment of the tuner. This is through a manual knob 250 mounted on the end of a rotatable shaft 252, to the inner end of which is connected a flexible drive shaft 254 terminating in a driving worm 256, trunnioned by ears 258 formed in gear train side plate 130. (See Fig. 7.) The worm 256 engages the spur gear 150 to turn it around its axis or to lock the same against rotation. In the event that the control solenoid 186 is deenergized and detent 192 locks the gear train against any rotation, then gear 154 is locked, and in turn locks gear 144 on the shaft of the planetary. Rotation of the manual knob 250 causes worm 256 to drive gear 150. Since this gear meshes with pinion 136, pinion 136 will be driven, and tend to rotate gear 144. However, since gear 144 meshes with what is now locked pinion 152, which cannot rotate, gear 154 will cause the planetary carriage to rotate around locked gear 152 and cause rotation of the planetary. This rotation will drive the treadle bar assembly through the clutch 122—76 and thus manual adjustment of the tuner is provided.

A push bar 270 is provided across the front of the tuner above the buttons 52 and a slight depression will actuate desired switching means. In order to control the control relay 186 to cause the automatic tuner to move on to the next station, manual switching means are provided to energize the same. This switch is shown at 272 mounted on a transverse member on the framework and is adapted to be actuated by a ring 274 on shaft 276 connected to the reciprocally mounted bar 270. The switch 272 is one which stays closed only while held in place and immediately returns to its open position upon the release of pressure upon the bar 270. The operator therefore presses the bar inwardly to close the switch and immediately upon energization of relay 186 will release the bar and the tuner will proceed automatically to the next station.

With the relay 186 and the detent 192 moved away from engagement with the vanes of the fly fan governor 166 the driving spring 168 tends to pull the planetary carriage clockwise about its pivot as viewed in Fig. 2. Gear 150 is locked in position since it meshes with the worm 256. Therefore pivotal movement of the carriage will cause pinion 136 to be driven by moving over locked gear 150. Since the gear train is unlocked, this will drive the train and the governor, which load will slow the movement due to the spring bias to a reasonable rate. The one-way ratchet drive in the gear train provides for recocking of the drive spring.

From the above it will be evident that we have provided a combination tuner which may be manually adjusted, quickly brought to a predetermined angular indexed position by any one of the buttons 52, or may be energized by depression on the bar 270 to index automatically upon receipt of a station. A single recocking or reloading coil is provided operable by either of two limit switching means to return the automatic drive to its loaded position or the tuner to its other extreme tunable position.

We claim:

1. In means for tuning radio apparatus, movable means to tune the apparatus over a predetermined frequency band moving between defined limits, operable means connected to said movable means to move the latter, power storage drive means connected to said operable means to move it and the movable means to tune over the complete band, clutch means between the power storage driving means and the operable means so that the two may move independently, and a single energizable means operably connected to both the operable means and to the power storage driving means to move either the operable means or the power storage means independently over the full path of travel.

2. In high frequency wave apparatus, movable tuning means to tune the apparatus over a predetermined frequency band moving between defined limits, a plurality of different types of driving means alternatively operably connected to the movable tuning means, a portion of the driving means being manually operable and a further portion being power operated, power storage means connected to said power operated portion of the driving means and energizable means connected selectively to the movable tuning means and to the power storage means to move either over its full range of travel and selective means to determine which of the means shall be moved by the energizable means.

3. In high frequency wave apparatus, movable tuning means to tune the apparatus over a predetermined frequency band movable between defined limits, a plurality of movable presettable means operatively engageable with the movable tuning means to individually move said tuning means to different predetermined preset positions, power driving means, clutch means interconnecting the movable tuning means and the power driving means so that the latter may cause the movable tuning means to scan over the band between said limits, indexing means associated with the power driving means to mechanically stop the same when a station is tuned in and a common energizable means operably connected with the power driving means and the movable tuning means to independently move either or both.

4. In high frequency wave apparatus, movable tuning means to tune the apparatus over a predetermined frequency band, a plurality of movable presettable means operatively engageable with the movable tuning means to individually move said tuning means to predetermined positions, power storage means, clutch means interconnecting said power storage means and said movable tuning means, energizable means, lost motion means interconnecting said power storage means and said energizable means through which the power storage means may be charged by the energizable means, and one-way driving means interconnecting the energizable means and the movable tuning means to move the movable tuning means in one direction upon energization of the energizable means.

5. In high frequency wave apparatus, movable tuning means to tune the apparatus over a predetermined frequency band, a plurality of movable presettable means operatively engageable with the movable tuning means to individually move said tuning means to predetermined positions, power storage means, clutch means interconnecting said power storage means and said movable tuning means, energizable means, lost motion means interconnecting said power storage means and said energizable means through which the power storage means may be charged by the energizable means, one-way driving means interconnecting the energizable means and the movable tuning means to move the movable tuning means in one direction upon energization of the energizable means, and selective control means associated with said one-way driving means to determine when the energization of the energizable means will move the movable tuning means.

6. In high frequency wave apparatus, movable tuning means to tune the apparatus over a predetermined frequency band, a plurality of movable presettable means operatively engageable with the movable tuning means to individually move said tuning means to predetermined positions, power storage means, clutch means interconnecting said power storage means and said movable tuning means, energizable means, lost motion means interconnecting said power storage means and said energizable means through which the power storage means may be charged by the energizable means, one-way driving means interconnecting the energizable means and the movable tuning means to move the movable tuning means in one direction upon energization of the energizable means, selective control means associated with said one-way driving means to determine when the energization of the energizable means will move the movable tuning means, a first switching means operable by the power storage means and connected to the energizable means to control the latter, and a second switching means operable by the movable tuning means and connected to the energizable means to independently control the energizable means.

7. In high frequency wave apparatus, movable tuning means to tune the apparatus over a predetermined frequency band, a plurality of movable presettable means operatively engageable with the movable tuning means to individually move said tuning means to predetermined positions, resilient driving means, clutch means interconnecting said resilient driving means and the movable tuning means, a gear train load connected to the resilient driving means to provide a desired rate of movement, signal actuated indexing means engageable with the gear train load to stop the resilient driving means when the tuner tunes in a station, clutch actuating means operated by any of the movable presettable means to declutch the resilient driving means upon movement of any of the movable presettable means and a common energizable means for independently reloading the resilient driving means and moving the movable tuning means to one limit of its movement.

8. In radio receiving apparatus, movable tuning means for tuning the apparatus over a predetermined band of frequencies movable between defined limits, resilient power driving means, clutch means interconnecting said resilient power driving means and said movable tuning means so that they may be moved independently, solenoid means, and movable means actuated by said solenoid and operably connected to both the resilient power driving means and the movable tuning means to independently move either to a predetermined limit position.

9. In radio receiving apparatus, movable tuning means for tuning the apparatus over a predetermined band of frequencies movable between defined limits, resilient power driving means, clutch means interconnecting said resilient power driving means and said movable tuning means so that they may be moved independently, reciprocable energizable means, selective interconnecting means connected between the reciprocable energizable means, and both the resilient power driving means and the movable tuning means so that the movement of the reciprocable energizable means may selectively and independently move either the resilient power driving means to reload the same or the movable tuning means to one limit of travel.

10. In radio receiving apparatus, movable tuning means for tuning the apparatus over a predetermined band of frequencies movable between defined limits, resilient power driving means, clutch means interconnecting said resilient power driving means and said movable tuning means so that they may be moved independently, solenoid means, reciprocable means connected to and driven by the solenoid means, and selective one-way drive coupling means between the movable tuning means and the reciprocable means to drive the movable tuning means to one limit position upon energization of the solenoid under certain conditions.

11. In radio receiving apparatus, movable tuning means for tuning the apparatus over a predetermined band of frequencies movable between defined limits, resilient power driving means, clutch means interconnecting said resilient power driving means and movable tuning means so that they may be moved independently, solenoid means, reciprocable means connected to and driven by the solenoid means, selective one-way drive coupling means between the movable tuning means and the reciprocable means to drive the movable tuning means to one limit of movement upon energization of the solenoid under certain conditions, and lost motion linkage means interconnecting said reciprocable means and the resilient power driving means so that the resilient power driving means may be loaded by energization of the solenoid.

12. In radio receiving apparatus, movable tuning means for tuning the apparatus over a predetermined band of frequencies, resilient driving means, clutch means interconnecting said resilient driving means and movable tuning means so that they may be moved independently, solenoid means, reciprocable means connected to and driven by the solenoid means, selective one-way drive coupling means between the movable tuning means and the reciprocable means to drive the movable tuning means upon energization of the solenoid under certain conditions, lost motion linkage means interconnecting said reciprocable means and the resilient driving means so that the resilient driving means may be loaded by energization of the solenoid, and a plurality of switching means connected to the solenoid for controlling the same, a part of which are operated by the movable tuning means and a part by the resilient driving means so that the position of either may control the solenoid energization.

References Cited in the file of this patent

UNITED STATES PATENTS

| | | |
|---|---|---|
| 2,511,580 | Goodrich | June 13, 1950 |
| 2,651,397 | Miller | Sept. 8, 1953 |